Aug. 4, 1959
R. ROSIER
2,897,724
LARGE-APERTURE OBJECTIVE
Filed May 9, 1957
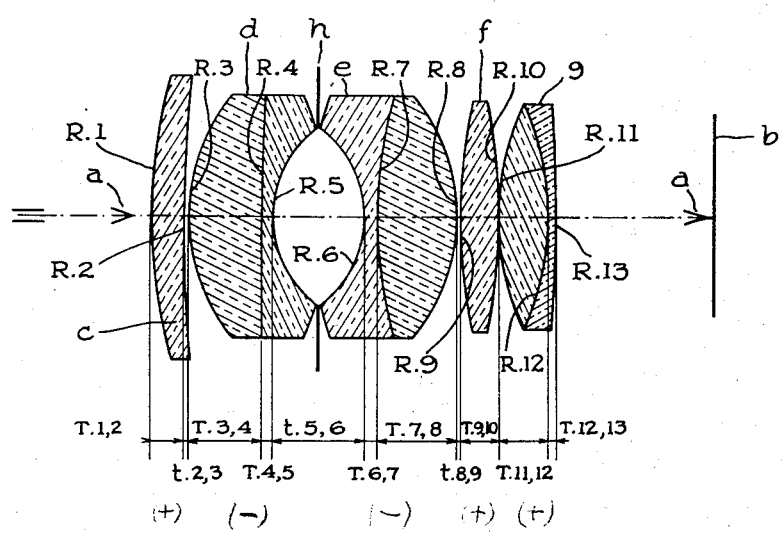
INVENTOR
*Raymond Rosier*
BY *Cameron, Kerkam & Sutton*
ATTORNEYS

United States Patent Office

2,897,724
Patented Aug. 4, 1959

2,897,724

LARGE-APERTURE OBJECTIVE

Raymond Rosier, Asnieres, France, assignor to Societe d'Optique et de Mecanique de Haute Precision, Paris, France, a company of France Application May 9, 1957, Serial No. 658,170

Claims priority, application France May 11, 1956

3 Claims. (Cl. 88—57)

The invention relates to an objective having a very large aperture.

The formulae for large-aperture objectives which can be used for photographic or cinematographic view-finders are generally derived from those of the type known as "Gauss."

The Gauss objective consists of four separate elements, which are as follows, in the direction of propagation of incident light: first of all a convergent element of plano-convex or similar shape, followed by a sharply cambered thick divergent meniscus element with its convex face directed towards the front, that is to say towards the incident light. Continuing in the direction of propagation of the light, another sharply cambered thick divergent meniscus element is encountered, with its concave face directed towards the front, and then a final convergent element having a shape approaching the biconvex.

The diaphragm is interposed between the two thick divergent menisci.

However, objectives of this type can only be constructed in practice provided their aperture does not exceed F/1.4.

The provision of larger apertures is in fact first of all limited by the sharp curvatures of the two faces disposed on either side of the diaphragm, the said curvatures not allowing the aperture size to be increased beyond a certain limit without the said faces coming into contact.

Further limitation is imposed by the high powers of the end convergent elements, which oppose the increase in effective diameters resulting from a larger aperture.

When it is desired to make objectives having a larger aperture, of the order of F/0.9 for example, the curvatures of the divergent meniscus elements disposed on either side of the diaphragm must be reduced to fairly low values in order to allow a sufficient aperture diameter, while allowing room to accommodate the diaphragm.

Still with the purpose of increasing the aperture of the objective, it is advantageous to break up the end convergent elements into a plurality of members in order that these elements can be given diameters corresponding to the aperture. Furthermore, zonal aberrations are simultaneously reduced, and these must be small if a good-quality image is to be obtained.

Since objectives of the "Gauss" type have their object focus in the vicinity of the first convergent element, it is not immaterial whether the first or final convergent element is broken up. In fact, any power added in front by the addition of another convergent lens does not appreciably increase the power of the assembly, but certainly increases the Petzval curvature, while reducing the optical extension of the objective.

In order to avoid the consequences, it is advantageous to place a lens of fairly low power in front, and to transfer the power to the rear convergent element.

If the rear convergent element is replaced by two lenses each of lower power, but having in conjunction a higher power than that of the convergent element on its own, a given total power can be achieved with both greater diameters, that is to say a larger aperture, and a long optical extension with small Petzval curvature.

The present invention relates to an objective whereof the aperture can be of the order of F/0.95, characterised in particular by the fact that the objective, of focal length F, comprises five separate optical elements, between two of which is disposed a diaphragm, the said five optical elements being, in the direction of propagation of incident light, a convergent lens of focal length $F_1$, convex to the front, a thick meniscus, convex to the front, whereof the front and rear radii of curvature are $R_3$ and $R_5$ respectively, a thick meniscus, concave to the front, whereof the radius of curvature directed to the front is $R_6$, a biconvex lens whereof the front and rear radii of curvature are $R_9$ and $R_{10}$ respectively, and a convergent biconvex element, the values of F, $F_1$, $R_3$, $R_5$, $R_6$, $R_9$ and $R_{10}$ satisfying the inequalities $$2\ F < F_1 < 4\ F$$
$$0.65\ F < R_3 < 0.85\ F$$
$$0.4\ F < R_5 < 0.5\ F$$
$$0.4\ F < |R_6| < 0.5\ F$$
$$2\ F < R_9 < 4\ F$$
$$2\ F < |R_{10}| < 4\ F$$

The invention will now be described in more detail, with reference to a particular method of embodiment given by way of example and illustrated in the drawing.

The single figure diagrammatically illustrates this particular method of embodiment.

In the drawing, the light comes from the left, as indicated by the arrows $a$. The photographic or cinematographic film $b$ is placed behind the objective, which comprises five separate optical elements.

The five optical elements are, in the direction of propagation of incident light, a convergent lens $c$, a thick meniscus $d$ convex to the front, that is to say convex to the side from which the incident light comes, a thick meniscus $e$ concave to the front, a biconvex lens $f$, and a convergent biconvex element $g$.

The diaphragm $h$ is preferably disposed between the two menisci $d$ and $e$, but this is not absolutely necessary, and it could be disposed elsewhere.

Also according to the invention, the power of the first convergent lens $c$ is low, in order, as previously stated, to obtain a long extension with low Petzval curvature when a high-power objective is used.

If the focal length of the objective is designated by F, the focal length $F_1$ of the first lens must be between 2F and 4F.

The front face 1 of the lens $c$ is convex, and the face 2 is very close to the plane shape. The lens $c$ is preferably slightly meniscular, that is to say the face 2 is slightly concave towards the rear.

The following meniscus $d$ is less cambered than those normally used in objectives of the so-called Gauss type.

If the radii of curvature of the front face 3 and the rear face 5 are designated by $R_3$ and $R_5$, the said radii must, according to the invention, satisfy the following inequalities:

$$0.65\ F < R_3 < 0.85\ F$$

$$0.4\ F < R_5 < 0.5\ F$$

The second meniscus $e$ which follows has two faces 6 and 8 whereof the radii of curvature are especially $R_6$ and $R_8$.

Fairly close values are used for the radii of curvature $R_5$ and $R_6$ in order to obtain an objective wherein zonal spherical aberrations, coma and astigmatism are very well corrected.

For example, $R_6$ may be made such as to satisfy the same inequality as $R_5$, that is to say:

$$0.4\ F < |R_6| < 0.5\ F$$

The radius of curvature $R_8$ of the face 8 may likewise be of the same order as the radius of curvature $R_3$.

The biconvex lens $f$ which follows the meniscus $e$ has faces 9 and 10 whereof the radii of curvature are respectively $R_9$ and $R_{10}$. According to the invention, these radii of curvature must preferably satisfy the following inequalities:

$$2\ F < R_9 < 4\ F$$

$$2\ F < |R_{10}| < 4\ F$$

Finally, the final convergent element $g$ is preferably of plano-convex shape or near thereto.

If $R_{11}$ and $R_{13}$ are the radii of curvature of the front face 11 and the rear face 13 respectively, these radii of curvature must satisfy the inequality $$|R_{13}| > 4R_{11}$$

As regards the refractive index, it is advantageous to make the value of the index $n_D$ (for the sodium line D) at least equal to 1.65 for the convergent lens $c$, the biconvex lens $f$ and the convergent element $g$.

Furthermore, the menisci $d$ and $e$ and the final convergent element $g$ each preferably consist of two lenses of opposite power in order to provide an achromatic effect, one lens in each case being of the convergent type and made of crown glass, and the other being of the divergent type and made of flint glass.

It is also possible, in the convergent element $g$, to dispose the crown glass in front or behind, the two versions differing simply in the direction of curvature of the cementing face 12.

In the menisci $d$ and $e$, the crown and flint elements are separated by the faces 4 and 7.

A numerical example of an objective such as that illustrated diagrammatically in the figure will now be given.

*Example*

The objective whereof the formula is given below has an aperture of F/0.95.

The values of the radii of curvature and thickness correspond to a focal length of 100 millimetres, the optical extension then being 61.84 millimetres.

| Radii of curvature in mm. | Thickness of glass and air in mm. | Refractive index for sodium line D $n_D$ | Dispersive power $\nu = \dfrac{n_D - 1}{n_r - n_c}$ |
|---|---|---|---|
| $R_1 = +172.0$ | $T.1,2 = 14.93$ | (c) 1.72275 | (c) 37.8 |
| $R_2 = +763.9$ | $t.2,3 = 0.77$ | | |
| $R_3 = +75.81$ | $T.3,4 = 28.56$ | (d) 1.69116 | (d) 54.0 |
| $R_4 = +2,029$ | $T.4,5 = 4.95$ | 1.59551 | 39.0 |
| $R_5 = +46.06$ | $t.5,6 = 34.55$ | | |
| $R_6 = -44.59$ | $T.6,7 = 4.95$ | (e) 1.68375 | (e) 31.3 |
| $R_7 = +174.7$ | $T.7,8 = 31.78$ | 1.69689 | 55.45 |
| $R_8 = -67.79$ | $t.8,9 = 0.77$ | | |
| $R_9 = +261.4$ | $T.9,10 = 14.66$ | (f) 1.69689 | (f) 55.45 |
| $R_{10} = -324.4$ | 0.77 | | |
| $R_{11} = +107.5$ | $T.11,12 = 19.19$ | (g) 1.69689 | (g) 55.45 |
| $R_{12} = -154.1$ | $T.12,13 = 3.07$ | 1.72110 | 28.9 |
| $R_{13} = -959.7$ | | | |

The invention is naturally not limited by the details which have just been described, which can be modified without departing from the scope of the invention.

What I claim is:

1. Objective having a very large aperture and having a focal length F, comprising five separate optical components, between two of which a diaphragm is disposed, the said five optical components being, in the direction of propagation of incident light, a convergent lens of focal length $F_1$, convex in front, a thick meniscus component, convex in front, whereof the front and rear radii of curvature are respectively $R_3$ and $R_5$, a thick meniscus component, concave in front, whereof the front radius of curvature is $R_6$, a biconvex lens whereof the front and rear radii of curvature are respectively $R_9$ and $R_{10}$, and a convergent biconvex component, the values of F, $F_1$, $R_3$, $R_5$, $R_6$, $R_9$ and $R_{10}$ satisfying the inequalities:

$$2\ F < F_1 < 4\ F$$

$$0.65\ F < R_3 < 0.85\ F$$

$$0.4\ F < R_5 < 0.5\ F$$

$$0.9\ F < \left|\frac{R_5}{R_6}\right| < 1.1\ F$$

$$2\ F < R_9 < 4\ F$$

$$2\ F < |R_{10}| < 4\ F$$

and the convergent biconvex component having two lens elements in contact the contact surfaces thereof being concave toward the incident light and satisfying the inequalities:

$$R_{13} > 4R_{11}$$

where $R_{13}$ is large and the corresponding lens element approaches plano-convex.

2. Objective having a very large aperture according to claim 1, in which the two menisci components and the convergent biconvex component each consists of two lenses of opposite powers, a convergent lens made of crown glass and a divergent lens made of flint glass.

3. Objective having an aperture of F/0.95 and having a focal length of 100 millimetres and an optical extension of 61.84 millimetres, comprising five separate optical components, between two of which a diaphragm is disposed, the said five optical components being, in the direction of propagation of incident light, a convergent lens of focal length $F_1$, convex in front, a fixed meniscus component, convex in front, whereof the front and rear radii of curvature are respectively $R_3$ and $R_5$, a fixed meniscus component, concave in front, whereof the front radius of curvature is $R_6$, a biconvex lens whereof the front and rear radii of curvature are respectively $R_9$ and $R_{10}$, and a convergent biconvex component, the values of $F$, $F_1$, $R_3$, $R_5$, $R_6$, $R_9$, and $R_{10}$ satisfying the inequalities:

$$2F < F_1 < 4F$$

$$0.65 F < R_3 < 0.85 F$$

$$0.4 F < R_5 < 0.5 F$$

$$0.9 F < \left|\frac{R_5}{R_6}\right| < 1.1 F$$

$$2 F < R_9 < 4 F$$

$$2 F < |R_{10}| < 4 F$$

and in which the components have the following characteristics:

| Radii of curvature in mm. | Thickness of glass and air in mm. | Refractive index for sodium line D $n_D$ | Dispersive power $\nu = \frac{n_s - 1}{n_v - n_C}$ |
|---|---|---|---|
| $R_1 = +172.0$ | T.1,2 = 14.93 | (c) 1.72275 | (c) 37.8 |
| $R_2 = +763.9$ | t.2,3 = 0.77 | | |
| $R_3 = +75.81$ | T.3,4 = 28.56 | (d) 1.69116 | (d) 54.0 |
| $R_4 = +2,029$ | T.4,5 = 4.95 | 1.59551 | 39.0 |
| $R_5 = +46.06$ | t.5,6 = 34.55 | | |
| $R_6 = -44.59$ | T.6,7 = 4.95 | (e) 1.68375 | (e) 31.3 |
| $R_7 = +174.7$ | T.7,8 = 31.78 | 1.69689 | 55.45 |
| $R_8 = -67.79$ | t.8,9 = 0.77 | | |
| $R_9 = +261.4$ | T.9,10 = 14.66 | (f) 1.69689 | (f) 55.45 |
| $R_{10} = -324.4$ | 0.77 | | |
| $R_{11} = +107.5$ | T.11,12 = 19.19 | (g) 1.69689 | (g) 55.45 |
| $R_{12} = -154.1$ | T.12,13 = 3.07 | 1.72110 | 28.9 |
| $R_{13} = -959.7$ | | | |

References Cited in the file of this patent

UNITED STATES PATENTS

| | | |
|---|---|---|
| 1,786,916 | Merte | Dec. 30, 1930 |
| 2,019,985 | Lee | Nov. 5, 1935 |
| 2,398,680 | Warmisham | Apr. 16, 1946 |
| 2,735,339 | Doi | Feb. 21, 1956 |

FOREIGN PATENTS

| | | |
|---|---|---|
| 565,566 | Germany | Dec. 2, 1932 |
| 884,478 | France | Apr. 27, 1943 |